(12) United States Patent
Arbeithuber et al.

(10) Patent No.: US 10,173,152 B2
(45) Date of Patent: Jan. 8, 2019

(54) FILTER DEVICE

(71) Applicant: EREMA ENGINEERING RECYCLING MASCHINEN UND ANLAGEN GESELLSCHAFT M.B.H., Ansfelden (AT)

(72) Inventors: Josef Arbeithuber, Ansfelden (AT); Klaus Feichtinger, Ansfelden (AT); Peter Pauli, Ansfelden (AT)

(73) Assignee: EREMA Engineering Recycling Maschinen und Anlagen GmbH, Ansfelden (AT)

( * ) Notice: Subject to any disclaimer, the term of this patent is extended or adjusted under 35 U.S.C. 154(b) by 0 days.

(21) Appl. No.: 15/026,941

(22) PCT Filed: Sep. 29, 2014

(86) PCT No.: PCT/AT2014/050223
§ 371 (c)(1),
(2) Date: Jun. 27, 2016

(87) PCT Pub. No.: WO2015/048831
PCT Pub. Date: Apr. 9, 2015

(65) Prior Publication Data
US 2016/0288026 A1    Oct. 6, 2016

(30) Foreign Application Priority Data
Oct. 4, 2013 (AT) .............................. A 50643/2013

(51) Int. Cl.
*B01D 29/64* (2006.01)
*B29C 47/08* (2006.01)
(Continued)

(52) U.S. Cl.
CPC ..... *B01D 29/6476* (2013.01); *B01D 29/0095* (2013.01); *B29C 47/0842* (2013.01);
(Continued)

(58) Field of Classification Search
None
See application file for complete search history.

(56) References Cited

U.S. PATENT DOCUMENTS 6,378,705 B1 *  4/2002  Bacher .................. B01D 29/01
                                            210/397

FOREIGN PATENT DOCUMENTS

AT          413 497 B      3/2006
DE       22 35 835 A1      1/1974
(Continued)

OTHER PUBLICATIONS

International Search Report dated Jan. 26, 2015, from corresponding International Application No. PCT/AT2014/050223, 3 pages.
(Continued)

*Primary Examiner* — Chester T Barry
(74) *Attorney, Agent, or Firm* — Kilpatrick Townsend & Stockton LLP

(57) ABSTRACT

The invention relates to a filter device for polymer melts, having a filter screen (1), through which the polymer melt to be purified is guided, wherein the filter device comprises at least one scraping element (2), which glides across the upstream surface (4) of the filter screen (1) with its scraping edge (3), or rests on the surface (4) with its end area nearest the scraping edge (3), and lifts off and/or scrapes off the contaminations (6) adhering to the surface (4) and those present in front of the screen orifices (5) in the course of its movement across the surface (4). According to the invention it is provided that the scraping edge (3) has a curvature (7) at least in the end area of the same, leading in the direction of movement (16), the radius (R) of which is less than 90%, preferably less than 50%, in particular less than 20% of the maximum diameter, or of the maximum orifice width of the screen orifices (5).

11 Claims, 2 Drawing Sheets

(51) Int. Cl.
*B29C 47/68* (2006.01)
*B01D 29/00* (2006.01)

(52) U.S. Cl.
CPC ........ *B29C 47/0888* (2013.01); *B29C 47/686* (2013.01); *B29C 47/687* (2013.01); *B01D 2201/08* (2013.01)

(56) References Cited

FOREIGN PATENT DOCUMENTS

| | | |
|---|---|---|
| DE | 38 09 372 A1 | 9/1989 |
| DE | 20 2011 105998 U1 | 11/2011 |
| EP | 0 312 354 A2 | 4/1989 |
| EP | 0925904 A1 | 6/1999 |

OTHER PUBLICATIONS

International Preliminary Report on Patentability dated Feb. 29, 2016, from corresponding International Application No. PCT/AT2014/050223, 8 pages.

\* cited by examiner

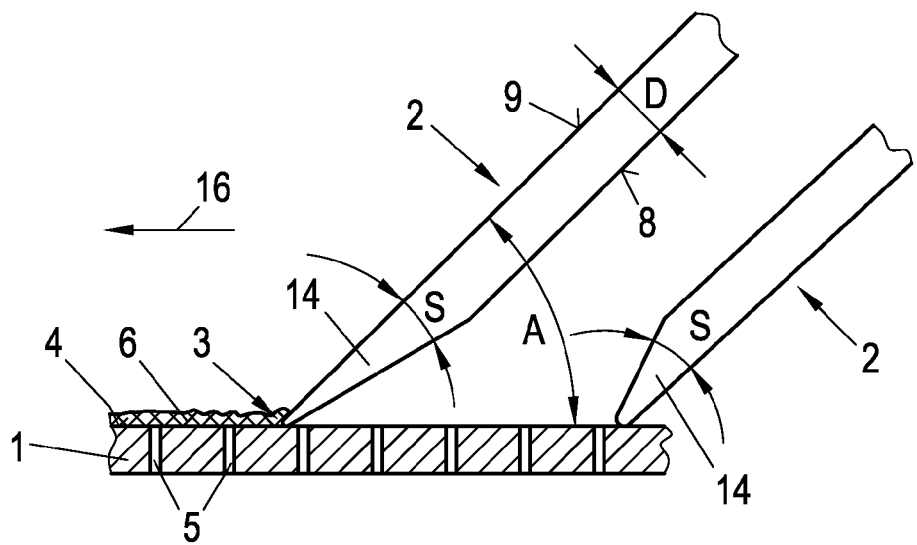
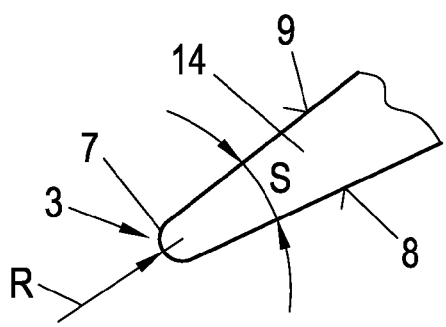
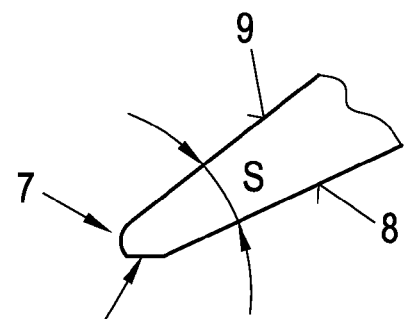
Fig. 1
Fig. 2
Fig. 3
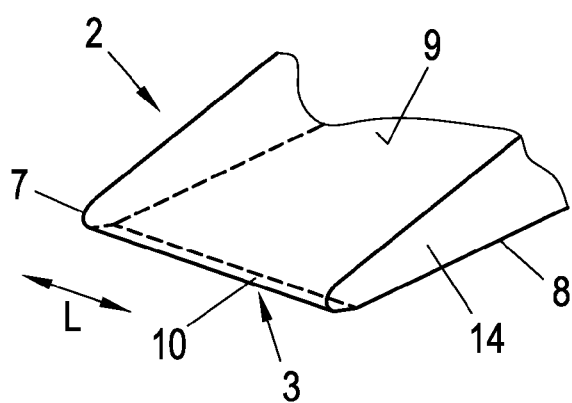
Fig. 4

FILTER DEVICE

This application is a U.S. National Phase of International Application No. PCT/AT2014/050223, filed Sep. 29, 2014, which claims priority to Austrian Patent Application No. A 50643/2013, filed Oct. 4, 2013, the disclosures of which are incorporated by reference herein.

The invention relates to a filter device according to the generic part of patent claim 1.

Plastic melts coming from accumulated secondary raw materials comprise an increased proportion of foreign matter (wood, paper, aluminum, foreign plastics, rubber, elastomers, etc.). In order to produce a respective quality of the re-granulate, said proportion of foreign matter must be removed from the melt as completely as possible. For this purpose, various methods, or filters are used, such as reciprocating filters, disk filters, continuous filters, or discontinuous filters. Among others, filter systems are used, comprising scraping elements moving across a metallic filter screen, which usually has a smooth surface and comprises screen orifices having a diameter in a range of a few μm up to several mm. The goal of the scraper elements is to lift off any remaining contaminations, and transfer the same to a discharge device. In addition to said basic functionality, the period of use of the filter screens and the reusability of the filter screens are of particular economic importance. Such filter systems should remain in use over a period of several days, weeks, if possible, even months, wherein throughputs of 100 tons to thousands of tons should be able to be run. For this purpose, said filter systems are to discharge any contaminations from the melt in the percent range.

For this purpose, the wear and tear of the two gliding partners consisting of the filter screen and the scraper element is of importance. It is also essential that the scraper element lifts off the contamination and does not push the same in front of it, or even stuffs it into the orifices of the screen. In this regard the particular shape of the scraper elements is of importance.

Furthermore, the thickness of the scraper element, its pitch, its point angle, the radius at the scraping edge, and the contact surface of the scraper element on the filter screen are also to be taken into consideration. These parameters interact and are important for the long-lasting operation of the filter device.

The goal of the invention is to develop a filter device, which has a long-lasting and simple construction, and in particular removes and discharges any contaminations from the surface of the filter screen in an efficient manner.

Said goals are achieved in a filter device of the above mentioned type, having the characteristics of the properties introduced in claim 1. According to the invention it is therefore provided that the scraping edge comprises a curvature, at least in the end section thereof, leading in the direction of movement, the radius of which is less than 90%, preferably less than 50%, in particular less than 20% of the maximum diameter, or of the maximum orifice width of the screen orifices, respectively.

It has been shown that the special embodiment of the curvature of the scraping edge essentially contributes to the long life thereof, and to the efficient removal of contaminations. According to the invention it is ensured that the scraping element efficiently lifts off the contaminations from the screen orifices, which may have a diameter of e.g. 100 to 200 μm, using the scraping edge thereof, because the radius of the scraping edge is smaller, than the dimension of the screen orifices. If said radius is too large, contaminations are being pushed in front of the scraper element and stuffed into the screen orifices, thus leading to a blockage of the screen orifices, causing a failure of the filter device, or the contaminations being pushed through, whereby an increased degree of contamination will enter into the re-granulate, leading to an inferior quality of the final product.

This radius, or the end area of that section of the scraping element having such a curvature, should remain largely unchanged during the period of use. This is provided that in addition to the friction partners of the filter screen and the scraping element, abrasive materials, such as metals, paper, sand fillers, etc., are also present as friction partners, and have an influence on the elimination of contaminations, or wear the scraping element. If the radius of the scraping edge is too large, contaminations are pushed in front of the scraping edge. This is critical, in particular, if the dimensions of the contaminations are within the size of the screen orifices. In this case, each contamination is pushed into the screen orifices multiple times, and pulled again, consequently resulting in an increased wear and tear of the filter screens and the scraping elements, thus shortening their period of use. However, if the scraper is too thick, has not respective point angle, or is also positioned too steeply with respect to the filter screen, an undesired rounding of the scraping edge may quickly be the result, and if no resharpening is effected, the filter device will fail.

It is of advantage, if a contact surface abuts the curvature of the surface of the end area of the scraping element nearest the screen, the extension of which, perpendicular to the longitudinal course of the scraping edge, corresponds to 5-fold to 100-fold, preferably the 10-fold to 50-fold of the maximum diameter, or the maximum orifice width of the screen orifices. The extension at the contact surface, or the dimensions thereof parallel to the direction of movement of the scraping element should not be too long, but also not be too short such that the curvature of the scraping edge may remain intact during operation by means of the resharpening necessary due to material wear by the polymer melt and the contaminations thereof.

It is further advantageous, if the scraping element is embodied in the shape of a disk, in particular having parallel, preferably plane large surfaces, i.e. a back face and a front face, and is disposed tilting at a pitch of 5 to 60°, preferably 10 to 45°, in particular 20 to 35°, toward the surface of the filter screen. If the scraping element is pitched too steeply against the surface of the filter screen, the radius of the curvature is enlarged due to material wear and tear, or the contact surface is reduced, and the scraping element may get stuck on the surface of the filter screen, which may result in the destruction of the filter screen.

The length, or the dimensions of the contact surface in the direction of movement, and/or the pitch, are therefore of importance in order to minimize the passage of contaminations through the filter screen as much as possible. If these two parameters are not adjusted as required, an undesired pressure is exerted onto the screen orifices, and contaminations are pushed into the screen orifices.

The point angle at the end of the scraper element nearest the screen is also important. According to the invention it is provided that the scraping element has a section in its end area nearest the screen, which terminates at the scraping edge, is tapered, and carries the curvature, wherein the point angle between the back face nearest the screen, which delimits said section, is 1 to 60°, preferably 5 to 30°, in particular 10 to 25°.

The adjustment of such parameters is also of importance in order to prevent any floating upwards, or lifting off of the scraping element with certain types of contaminations, such as aluminum foils. Sand contaminations also lead to a floating upwards, and in this case, the scraping element may no longer be able to fulfill its task.

For the efficient discharging of contaminations being lifted off, or discharged from the surface of the filter, it is of advantage, if the front face of the scraping element nearest the screen, coming from the scraping edge, extends toward the end of the scraping element furthest from the screen in a kink-free manner. A kink-fee transition of the tapering section into the wall surface of the scraping element furthest from the screen has the advantage that any contaminations lifted off do not need to cross an edge, which may be a disruptive factor during the deflection and discharging of contaminations, in particular by means of turbulences.

A constructively simple setup of the scraping element provides that the thickness of the disk-shaped scraping element is 0.5 to 30 mm, preferably 1 to 15 mm, in particular 2 to 8 mm, and/or that the length of the scraping element is the 5-fold to 50-fold, preferably the 8-fold to 30-fold of the thickness of the scraping element. Advantageously, the scraping element is embodied in the shape of a disk, having an elongated, preferably rectangular cross-section, at the short side of which a tapering section is connected, or embodied, which finally embodies a point angle tapering off into the scraping edge with a curvature.

The filter device according to the invention prevents that contaminations are continuously lead along the surface of the filter screen in longitudinal direction, thus causing the contamination to be spread, until the same is small enough in order to pass through the screen orifices. Due to the curvature provided at the scraping edge, the contaminations are efficiently conveyed upward by the scraping element, and discharged at a location provided.

The point angle provided has the effect that with the wear of the scraping edge due to abrasive materials, the end area of the tapering section increases in thickness only slowly with an increasing distance of the surface of the filter screen, and the radius of the curvature of the scraping edge remains largely intact despite of the mechanical wear and tear caused by abrasive materials, and the extension and length of the circular arc of the curvature, extending in the direction of movement, decreases only slowly. For this reason it is also advantageous, if the thickness of the disk-shaped scraping elements is kept low, since the tapering section then is easier to construct.

The thickness of the scraping element is also of significance for the adjustment of the scraping element to the surface of the filter screen. Thick scraping elements may not be adjusted to undulating filter screens without any problems; relatively thin scraping elements may also follow undulated screens. Furthermore, thin scraping elements may also become twisted around the scraping edge in the direction of their transversal axis.

In practice, it is possible without any problems for the contact surface to assume a width of 1 to 5 mm, usually from 2 to 3 mm. However, the embodiment of the curvature at the scraping edge is essential, and the contact surface may either be embodied to a certain degree during the production of the scraping element, or may also be adjusted during operation by means of respective wear and tear.

The invention is explained in further detail based on the drawing, as follows.

FIG. 1 schematically shows a section across a filter device according to the invention.

FIGS. 2 and 3 show detailed views of the end of the scraping element nearest the screen.

FIG. 4 shows a perspective view of a scraping element.

Figure 5:
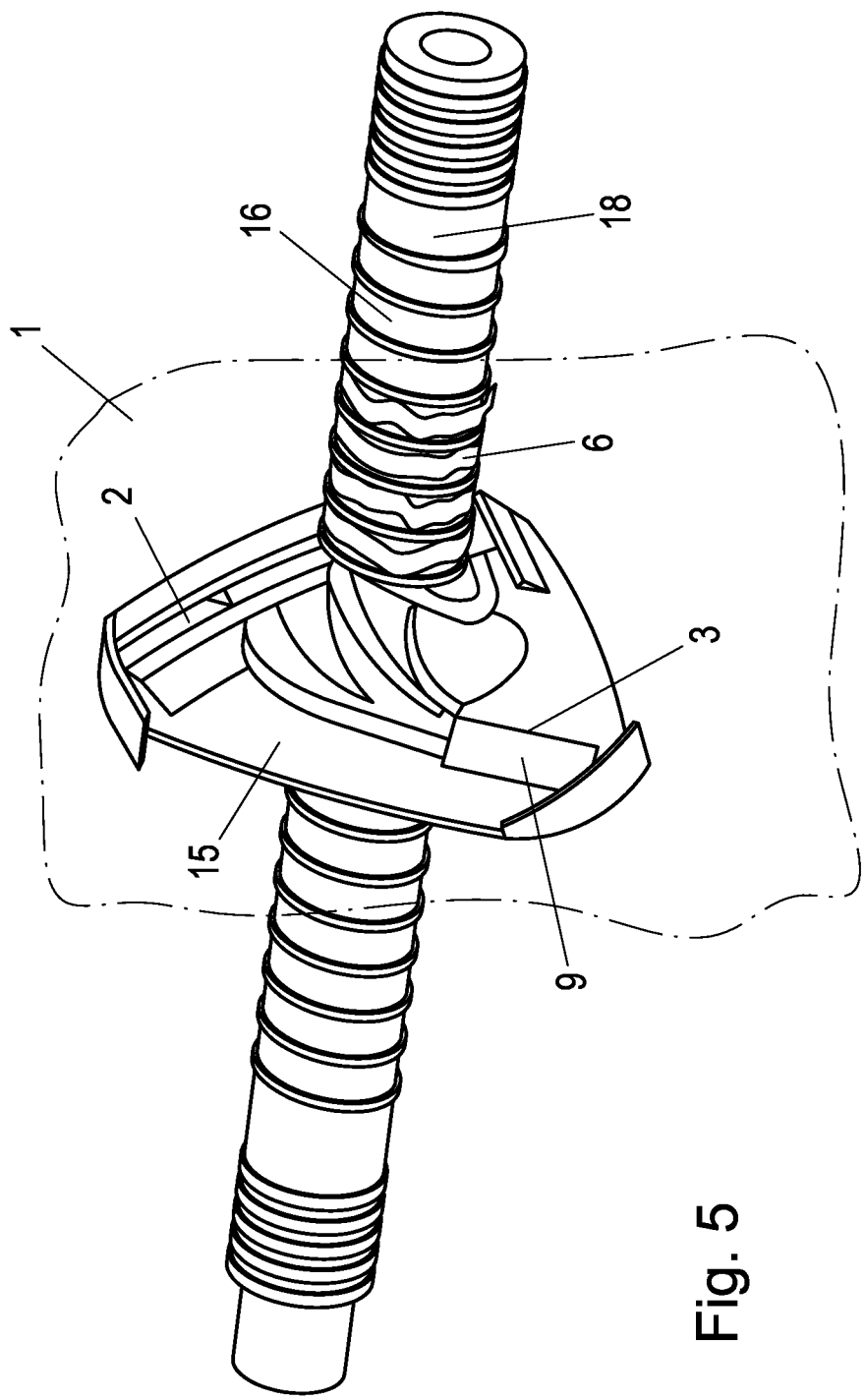
FIG. 5 shows scraping elements mounted on a carrier, such as may be used in a device for recycling polymers.

FIG. 1 shows a simple embodiment of a filter device according to the invention at a schematic section. A scraping element 2 rests on the surface 4 of a filter screen 1 by means of a scraping edge 3, glides into operation in the direction of the arrow 16 in longitudinal direction along said surface 4, and lifts off any contaminations resting on the surface 4, or blocking the screen orifices 5 of the filter screen 1, by means of a scraping edge 3. For this purpose, said contaminations are moved in longitudinal direction of the arrow 17, and are fed to a discharge unit that is not illustrated.

The filter screen 1 is comprised mostly of metal. The scraping element 2 is held in position by means of a carrier that is not illustrated.

The scraping element 2 is embodied in the shape of a disk, in particular in the shape of a disk having a rectangular cross-section, and has a back face 8 nearest the screen and a front face 9 further away from the screen. These two faces 8, 9 form a section 14 positioned in an end area of the of the scraping element 2, which tapers in the direction toward the filter screen 1 and forms a point angle S. In an end area nearest the screen the tapered section 14 also has a point angle S of 1 to 60°, preferably 5 to 30°, in particular 10 to 25°, terminating at a scraping edge 3. A curvature 7 is embodied at the end area nearest the screen.

It is possible that the back face 8, as seen in the scraping element 2 illustrated on the right hand in FIG. 1, extends in a kink-free manner. For discharging the contaminations 6, however, it is preferred that the front face 9 of the scraping element 2 furthest from the screen, coming from the curvature 7, extends toward the end of the scraping element 2 in a kink-free manner.

In FIG. 2 illustrates a detailed view of the scraping edge 3. The scraping edge 3 has a curvature 7 in its leading end in its direction of movement 16, the radius R of which is less than 90%, preferably less than 50%, in particular less than 20% of the maximum diameter, or the maximum orifice width of the screen orifices 5. The curvature 7 may extend across the entire point, i.e. from the front face 9 to the back face 8, and enables an efficient lifting off of the contaminations 6 from the surface 4 of the filter screen 1, and even a pulling out of contaminations from the screen orifices 5.

It is also possible—as illustrated in FIG. 3—to embody the end of the section 14 nearest the screen such that a contact surface 10 is connected to the curvature 7 at the surface 8 of the end area of the section 14 nearest the screen, the extension of which perpendicular to the longitudinal course L of the scraping edge 3 corresponds to the 5-fold to 100-fold, preferably the 10-fold to 50-fold of the maximum diameter, or the maximum orifice width of the screen orifices 5. Said contact surface 10, which is connected to the curvature 7, extends parallel to the surface 4 of the filter screen 1 and improves the lifting off of the contaminations 6, or prevents any significant change of the point angle S due to its surfaces, or the wear and tear of the curvature 7 during operation such that the life span of the scraping element 2 is increased. Said contact surface 10 may be omitted during operation, or may already be embodied before initial operation of the scraping element 2.

As seen in FIG. 1, the scraping element 2 is disposed at a pitch A toward the surface 4 of the filter screen 1 in an inclining manner. The scraping element 2 is embodied in the shape of a disk, in particular having parallel, preferably plane large surfaces, i.e. a back face 8 and a front face 9, and is disposed at a pitch A of 5 to 60°, preferably 10 to 45°, in particular 20 to 35°, toward the surface of the filter screen 1 in an inclining manner. The pitch A is considered to be the angle between the large surface of the scraping element 2 extending in a kink-free manner and the surface 4 of the filter screen 1. Insofar as the section 14 of the scraping element 2 is embodied such that both large surfaces 8, 9 transition into the section 14 at a kink, the pitch A is measured between the front face 9 of the scraping element 2 and the surface 4 of the filter screen 1.

FIG. 4 shows a perspective view of a scraping element 2 according to the invention. The front face 9, transitioning into the section 14 and into the curvature 7 of the scraping edge 3 can be seen. A contact surface 10 is connected at the curvature 7, which transitions into the back face 8.

The thickness D of the disk-shaped scraping element 2 is 0.5 to 30 mm, preferably 1 to 15 mm, in particular 2 to 8 mm. The length of the scraping element 2 is the 5-fold to 50-fold, preferably the 8-fold to 30-fold of the thickness D of the scraping element 2. With such scraping elements 2, it is commonly possible in a simple manner to embody a respective tapering, or a section 14, respectively, comprising the desired point angle S and a sufficient mechanical stability.

FIG. 5 shows an exemplary embodiment of a filter device according to the invention, wherein the position of the filter screen 1 is merely indicated. In this case, the filter screen 1 would be stationary, and the scraping elements 2, along with their scraping edges 3, are rotatably mounted on a carrier 15 relative to the stationary filter 7, which carrier 15 is mounted on a rotatable shaft 18. During operation the polymer melt is guided across channels embodied in the carrier 15 upstream toward the surface 4 of the filter screen 1, and is pushed through the same and discharged, wherein the contaminations 6 are lifted off of the filter screen 1 by means of the rotating movement of the scraping elements 2, and discharged separately. As explained with regard to FIG. 1, said contaminations 6 are discharged by the scraping elements 2, guided in the direction of the grooves 16 embodied on the shaft 18, and via these grooves 16 the contaminations 6 are discharged together with a certain proportion of the polymer melt.

The filter device according to the invention is present in two functional embodiments. Before initial operation, the section 14 carrying the curvature 7 may be embodied with or without a contact surface 10. If the section 14 is embodied without a contact surface 10, said contact surface 10 may be embodied by means of initial operation. An efficient discharge of contaminations is supported both by means of such an intake action and by means of the enlargement of the contact surface during continued operation.

An advantageous embodiment is one which provides that the curvature 7 extends from the front face 9 furthest away from the screen at least to the point of the section 14 nearest the screen filter, to which the contact surface 10 is optionally connected, or that the curvature 7 is guided from the front face 9 to the back face 8 around the contact point of the scraping element 2 at the surface 4, or around the point positioned furthest to the front in the direction of movement 16 of the scraping element 3. Said curvature 7, illustrated in FIG. 2, extending around the point angle of the scraping element 3, improves the lifting off of the contaminations, or increases the service life, respectively. With the wear and tear of the curvature 7 facing the surface 4, the contact surface 10—as shown in FIG. 3—may be formed in a defined position.

The invention claimed is:

1. A filter device for polymer melts, having a filter screen, through which the polymer melt to be purified is guided, wherein the filter device has at least one scraping element, which glides across the upstream surface of the filter screen with a scraping edge, or which rests on the upstream surface with its end area nearest the scraping edge, lifting off and/or scraping off contaminations adhering to the upstream surface and those present in front of the screen orifices in the course of its movement across the upstream surface, wherein the scraping edge has a curvature at least in the end area of the same, leading in a direction of movement of the scraping element, the radius of which is less than 90% of the maximum diameter, or of the maximum orifice width of the screen orifices;

wherein a contact surface is connected to the curvature at the back face of the end area of the scraping element nearest the filter screen, and an extension of which perpendicular to a longitudinal course of the scraping edge corresponds to a 5-fold to 100-fold of the maximum diameter, or the maximum orifice width of the screen orifices;

wherein the scraping element, in an end area nearest the filter screen, has a section terminating in the scraping edge, which is tapered and carries the curvature; and wherein a point angle between the back face nearest the filter screen, delimiting said section, and a front face nearest the filter screen is between 1° to 60°.

2. The filter device according to claim 1, wherein the longitudinal course of the scraping edge corresponds to 10-fold to the 50-fold of the maximum diameter, or the maximum orifice width of the screen orifices.

3. The filter device according to claim 1, wherein the scraping element is embodied in the shape of a disk and is disposed at a second point angle between 5° to 60° toward the surface of the filter screen in an inclined manner, and the front face of the scraping element furthest from the filter screen extends perpendicular to the scraping edge, coming from the curvature of the scraping edge toward the end of the scraping element furthest from the filter screen, in a kink-free manner.

4. The filter device according to claim 1, wherein the point angle is from 5° to 30°.

5. The filter device according to claim 1, wherein the curvature extends from the front face furthest from the filter screen and extends at least up to the point of the section nearest the filter screen, at which the contact surface is connected, or the curvature is guided from the front face to the back face around a contact point of the scraping element on the upstream surface, or around the point positioned furthest to the front in the direction of movement of the scraping element.

6. The filter device according to claim 1, wherein the radius of the curvature is less than 50% of the maximum diameter or of the maximum orifice width of the screen orifices.

7. The filter device according to claim 1, wherein the radius of the curvature is less than 20% of the maximum diameter or of the maximum orifice width of the screen orifices.

8. The filter device according to claim 3, wherein the scraping element is embodied in the shape of a disk wherein the back face and the front face are parallel.

9. The filter device according to claim 3, wherein the second point angle is from 10° to 45°.

10. The filter device according to claim 3, wherein the second point angle is from 20° to 35°.

11. The filter device according to claim 4, wherein the point angle is from 10° to 25°.

\* \* \* \* \*